Figure 1:
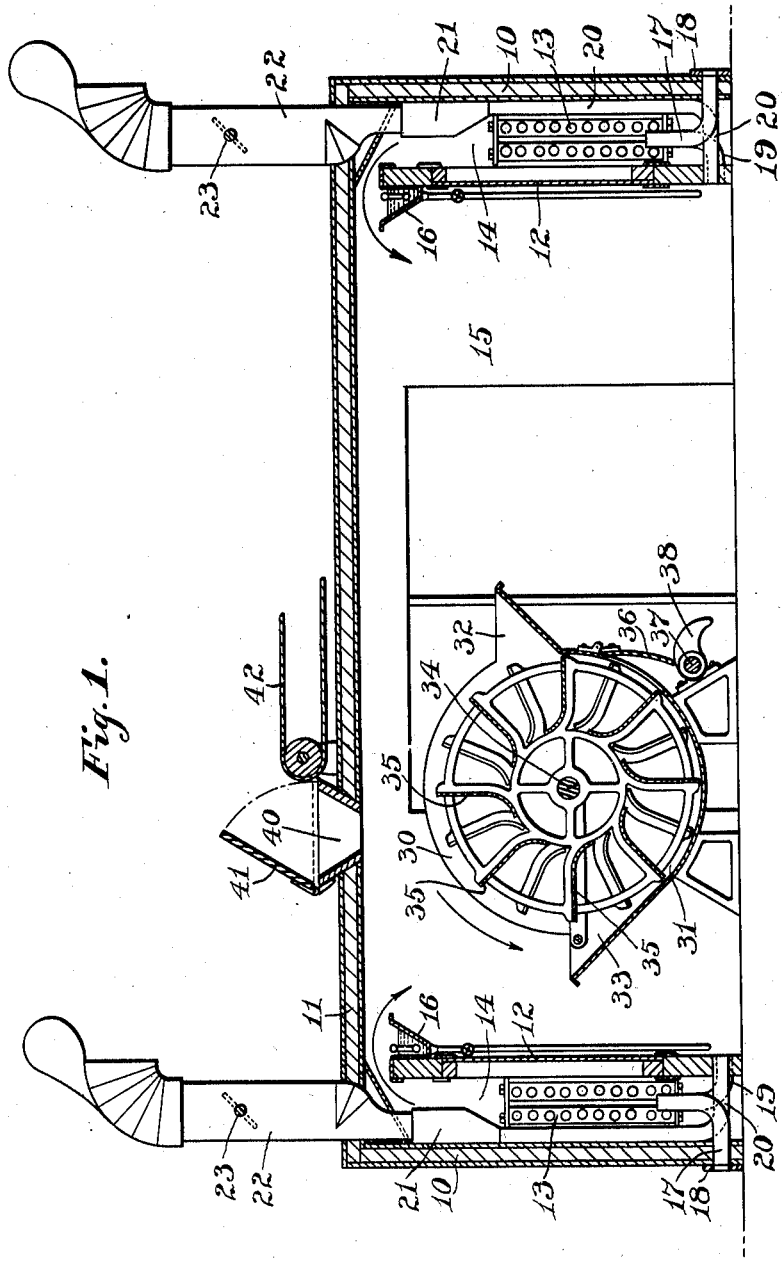

Oct. 27, 1925.

H. HUNTER ET AL 1,558,546

PROCESS AND APPARATUS FOR TREATING RECLAIMED RUBBER

Filed March 2, 1922      2 Sheets-Sheet 1

INVENTORS
Harry Hunter, deceased,
by Paul R. McCampbell, Admr.
Oren M. Ragsdale, BY G.B.Schley.      ATTORNEY

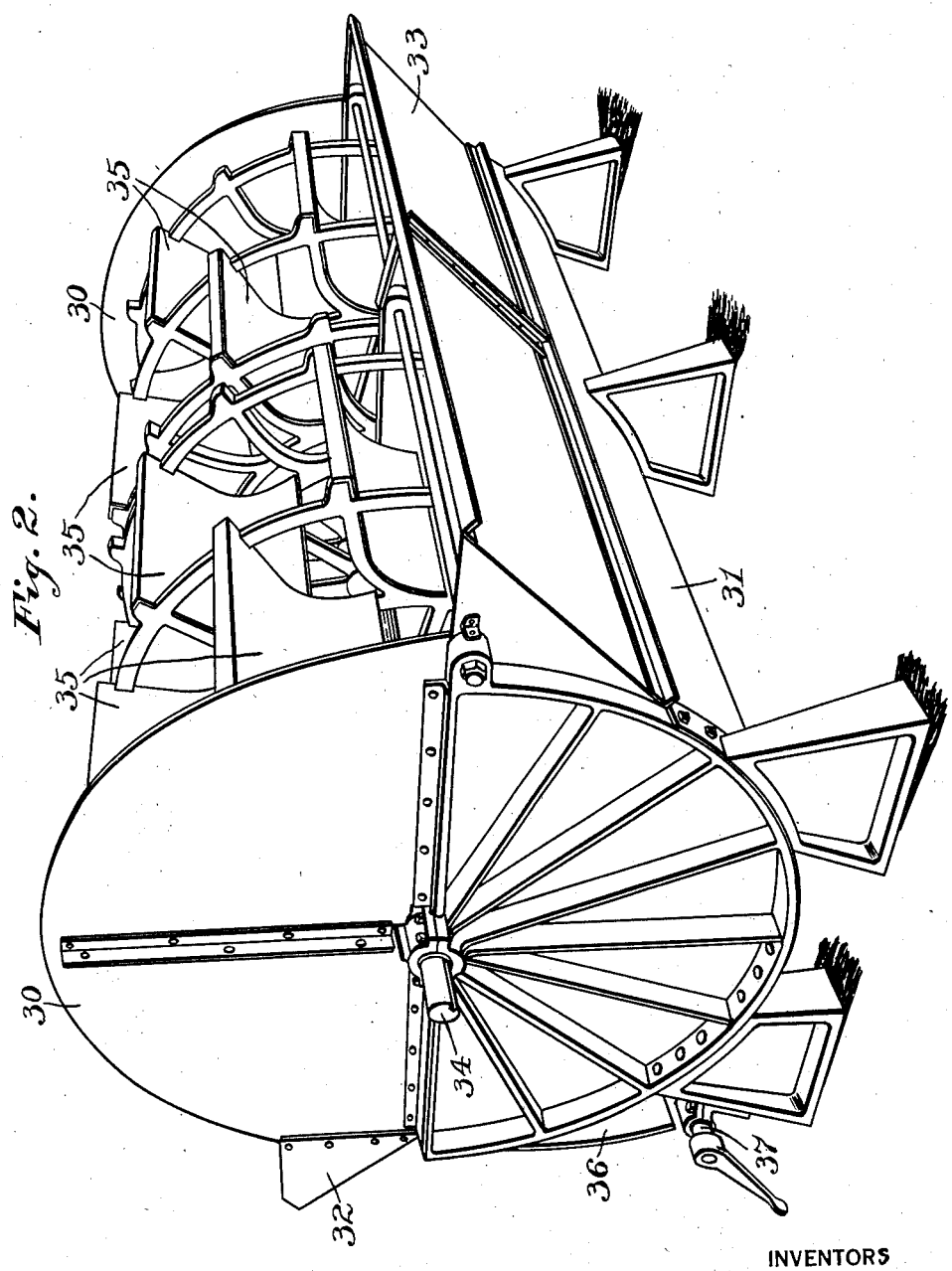

Patented Oct. 27, 1925.

1,558,546

UNITED STATES PATENT OFFICE.

HARRY HUNTER, DECEASED, LATE OF INDIANAPOLIS, INDIANA; BY PAUL R. McCAMPBELL, ADMINISTRATOR, OF INDIANAPOLIS, INDIANA, AND OREN M. RAGSDALE, OF INDIANAPOLIS, INDIANA, ASSIGNORS, BY MESNE ASSIGNMENTS, TO CARRIER ENGINEERING CORPORATION, OF NEWARK, NEW JERSEY, A CORPORATION OF NEW YORK.

PROCESS AND APPARATUS FOR TREATING RECLAIMED RUBBER.

Application filed March 2, 1922. Serial No. 540,427.

*To all whom it may concern:*

Be it known that HARRY HUNTER, deceased, who before his death was a citizen of the United States, residing at Indianapolis, in the county of Marion and State of Indiana, and OREN M. RAGSDALE, a citizen of the United States, residing at Indianapolis, in the county of Marion and State of Indiana, have invented a new and useful Process and Apparatus for Treating Reclaimed Rubber, of which the following is a specification.

It is the object of the present invention to improve the treatment of reclaimed rubber, especially in connection with the removal of moisture from such reclaimed rubber.

In the prior Patent No. 1,218,261, granted March 6, 1917, to the aforesaid Harry Hunter, now deceased, for a process of treating rubber, an improved process of treating such rubber was set forth, whereby the rubber was treated with humid air at higher temperatures than were possible with previous methods which contemplated the use of dry air. This process has been most successful, and had been very widely adopted in the treatment of both new and reclaimed rubber.

In the treatment of reclaimed rubber, however, the use of trays for supporting the rubber has caused some difficulty in practicing the process, because it was found that the reclaimed rubber, which was preliminarily cut into small pieces and suitably separated from other substances with which it was associated, such as the fabric of old tires, would mat together and greatly diminish the surface exposed to the air.

The present invention contemplates the use of the humid air and higher temperatures of the process set forth in the aforesaid prior patent, and in addition contemplates keeping the pieces of reclaimed rubber from sticking together, and stirring them up, and dropping them as separate pieces through the air, so that the humid and heated air may act more readily on them.

The accompanying drawings illustrate the invention. Fig. 1 is a somewhat diagrammatic vertical section through a kiln and agitator used for the practice of the process, the agitator per se constituting part of the invention; and Fig. 2 is a perspective view of such agitator, to show the construction thereof.

The dry kiln is conveniently of the type illustrated, as that gives the desired humidity and heat to the air, under convenient control. Preferably this kiln comprises outer walls 10 and a ceiling 11, with a vertical partition 12 extending from the floor nearly to the ceiling close to each of one or more side walls 10—two such partitions being shown near opposite side walls — with heating coils 13, usually steam coils, located in the narrow vertical space 14 between each partition 12 and its adjacent side wall, so that air supplied to the bottom of such space 14 will rise through such space and pass over the top of the partition 12 into the main drying chamber 15; and at the upper edge of each partition 12 there is provided a humidifying tank 16, conveniently extending the whole length of the partition, for holding water over the surface of which the air entering the drying chamber 15 must pass to be humidified thereby. Air is supplied to the bottom of each space 14 and to the bottom of the heating coils 13 by inlet pipes which lead from the atmosphere through the lower part of the side wall 10, which inlet pipes 17 may be provided with a control damper 18; and also by return air pipes 19 which lead from the drying chamber 15 through the lower part of the partition 12. Air-exhaust pipes 20 also lead from the drying chamber 15 through the bottom of the partition 12 and extend upward through the space 14 to manifold drums 21, from which exhaust flues 22, which may be provided with control dampers 23, lead through the ceiling 11 to the outside. The heat from the coils 13 causes air to rise through each space 14 and whatever air pipes are within such space. In consequence, air is drawn into the bottom of the space 14 through both the pipes 17 and 19, rises through such space, and is discharged over the top of the partition 12 and over the water in the tank 16 into the drying chamber, thus creating a push on the air as it goes into the drying chamber; and in addition air is drawn out from the bottom of the drying chamber through the pipes 20 and drum 21, and heated as it passes through such pipes and drum, so that this heating produces a pull on the outgoing air. It is found that this makes an excellent air-circulation through the drying chamber. The relative proportions of the fresh air and return air used are adjustable by the dampers 18 and 23, when such dampers are provided. The humidity of the air is governed by the temperature of the water in the tank 16, and such temperature is controlled either automatically or manually, and the supply of water is maintained in such tank either automatically or manually, to give the desired air humidity in the treatment of the rubber. A convenient and highly efficient arrangement for controlling both such water temperature and water quantity is that shown in the aforesaid Hunter patent; but such specific automatic means forms no part of the present invention.

The humidity and temperature of the air are governed as set forth in the aforesaid prior Hunter patent. The air temperature may range from 100° to 210° F., and the relative humidity may range from 15% to 75% or even 80%, the relative humidity being higher for higher temperatures to produce the best results. The best results are produced most quickly with an air temperature of from 140° to 180° F. and a relative humidity of between 25% and 35%, and both the temperature and the relative humidity are preferably kept substantially constant during the drying process.

Nothing further is necessary in the treatment of new rubber than what is set forth in the aforesaid Hunter patent, for the new rubber ordinarily is in sheets, and these are placed on trays, and have a large surface exposed to the air. In treating reclaimed rubber, however, as from old tires, the rubber-containing material is first ground up and suitably treated chemically to remove the non-rubber material, particularly the fabric of tires, and then washed. The rubber particles remaining after such treatment are then in a wet condition. If these pieces are put on trays, and merely left there during the treatment in the dry kiln, it is found that they mat together, more or less firmly, and thus greatly diminish the surface exposed to the air.

Therefore, in the treatment of reclaimed rubber, according to this invention, the particles of reclaimed rubber being treated, after having the fabric and other foreign material removed from them and being washed, are put into the rotary agitator shown in both Figs. 1 and 2. This agitator consists of a container formed of end plates 30 and an open-topped bottom portion 31 in the general form of a segment of a cylinder, with guards 32 and 33 on both sides of such casing extending its whole length; and in this casing is a slowly moving rotor mounted on a shaft 34. This rotor comprises a number of circular series of blades 35, each series of blades being displaced axially from the adjacent series, and the blades of adjacent series being staggered, as is most clear from Fig. 2. The individual blades are preferably straight axially and curved radially, with their inner parts circumferentially advanced in the direction of rotation beyond their outer parts; and the blades are conveniently supported on suitable supporting rings which are interspersed between the series of blades, such supporting rings in turn being mounted on the shaft 34.

In operation, the rotor of the agitator is driven slowly in the direction of the arrow (Fig. 1), usually at a speed of about four revolutions per minute though this particular speed is not essential. As the rotor rotates, the successive blades 35 travel close to the inside surface of the bottom part 31 of the agitator casing, and pick up the pieces of reclaimed rubber which are lying there, which reclaimed rubber then contains a large percentage of moisture. These pieces of reclaimed rubber thus picked up are carried around by the blades, against the inside surface of the casing, until the blades reach the horizontal, whereupon the blades themselves then continue to carry a large part of the pieces of rubber, although pushing some of them up into the guard 32 from which they roll back more or less into the lower part of the casing. The pieces of rubber which are scooped up by the blades 35 are rolled inward along such blades, and drop off the inner edges and the sides of the blades back into the bottom of the casing. This not only keeps the pieces of rubber from matting together, but also lets the pieces drop individually through the hot humid air which fills the agitator as well as the rest of the drying chamber 15. The treatment of the rubber and the removal of the moisture therefrom is facilitated both by this movement of the rubber through the air and by the keeping separate of the rubber pieces.

When the treatment of the reclaimed rubber is completed, which will usually be within sixteen to twenty-four hours and is frequently less, the door 36 which is provided along that side of the casing 31 on which the blades 35 ascend is opened, by rocking the shaft 37 which carries closing cams 38 for such door 36, whereupon the continued movement of the rotor causes the blades 35 to sweep the now-treated rubber out through the door opening and into any suitable container placed to receive such treated rubber.

The treatment of reclaimed rubber in the agitator may be carried on at the same time that the treatment of new rubber is carried on in other parts of the drying chamber 15.

Preferably, the reclaimed rubber particles are fed into the rotary agitator through an opening 40 in the kiln-ceiling 11, which opening is suitably closable by a door 41; and the rubber particles may be supplied to the opening 40 by any suitable conveyor 42.

The invention claimed is:

1. The improvement in the art of treating rubber, which consists in exposing to air a mass of small pieces of reclaimed rubber to be treated, and agitating and repeatedly dropping the pieces through the air to separate the pieces and maintain at a maximum the surface exposed to the air, and maintaining such air at a relative humidity of between 15% and 75% and at a temperature higher than 110° F.

2. The improvement in the art of treating rubber, which consists in exposing to air a mass of small pieces of reclaimed rubber to be treated, agitating such mass to keep the pieces separate and maintain at a maximum the surface exposed to the air, and maintaining such air at a relative humidity of between 15% and 75% and at a temperature higher than 110° F.

3. The improvement in the art of treating rubber, which consists in exposing to air a mass of small pieces of reclaimed rubber to be treated, agitating such mass to keep the pieces separate and maintain at a maximum the surface exposed to the air, and maintaining such air at a predetermined comparatively high relative humidity and temperature.

4. The improvement in the art of treating rubber, which consists in exposing to air a mass of small pieces of reclaimed rubber to be treated, agitating such mass and repeatedly dropping the pieces separately through the air to keep the pieces separate and maintain at a maximum the surface exposed to the air, and maintaining such air at a high relative humidity and at a temperature greater than 110° F.

5. The improvement in the art of treating rubber, which consists in exposing to air a mass of small pieces of reclaimed rubber to be treated, agitating such mass to keep the pieces separate and maintain at a maximum the surface exposed to the air, and maintaining such air at a high relative humidity and at a temperature greater than 110° F.

6. The hereindescribed method of treating rubber, which consists in exposing to air a quantity of small pieces of the rubber to be treated, manipulating the rubber so as to repeatedly separate the small pieces and expose the small separated pieces to the air, and maintaining such air at a temperature higher than 100° F. and at a relative humidity greater than approximately 15 per cent.

7. The hereindescribed method of treating rubber which consists in reducing the rubber to be treated to a finely divided condition, manipulating the rubber so as to repeatedly separate the small pieces of rubber and subject the pieces while separated to the action of air, and maintaining such air at a temperature higher than 100° F. and at a relative humidity greater than approximately 15 per cent.

8. An agitator for use in treating rubber, comprising a casing having a curved bottom, and a rotor having a plurality of annular series of blades arranged to scoop material from the bottom of such casing and drop it back into such casing as the rotor rotates, blades of adjacent annular series being relatively staggered.

9. An agitator for use in treating rubber, comprising a casing having a curved bottom, and a rotor having blades arranged to scoop material from the bottom of such casing and drop it back into such casing as the rotor rotates, each of said blades being so shaped that substantially none of its working surface lies angularly in rear of the outer edge with reference to the direction of rotation.

10. In combination, a dry kiln having a drying chamber, and an agitating machine within said drying chamber, said agitating machine having a casing separate from the walls of said drying chamber and a rotary agitating element, and said dry kiln having a feed opening through its ceiling above said agitating machine for supplying material to said agitating machine.

11. In combination, a dry kiln having a drying chamber, and an agitating machine within said drying chamber, said agitating machine having a casing separate from the walls of said drying chamber and a rotary agitating element, and said dry kiln having a feed opening through its ceiling above said agitating machine for supplying material to said agitating machine, and a conveyor for carrying material to and discharging it through said opening.

In witness whereof, we have hereunto set our hands at Indianapolis, Indiana, this 10th day of February, 1922.

PAUL R. McCAMPBELL,
*Administrator of the Estate
of Harry Hunter, deceased.*
OREN M. RAGSDALE.